United States Patent
Chen et al.

(10) Patent No.: US 6,923,922 B2
(45) Date of Patent: *Aug. 2, 2005

(54) RECOVER AND RECYCLE RHODIUM FROM SPENT PARTIAL OXIDATION CATALYSTS

(75) Inventors: Zhen Chen, Ponca City, OK (US); Kevin L. Ricketson, Ponca City, OK (US); Baili Hu, Ponca City, OK (US); Harold A. Wright, Ponca City, OK (US); Joe D. Allison, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/828,598

(22) Filed: Apr. 21, 2004

(65) Prior Publication Data

US 2004/0202607 A1 Oct. 14, 2004

Related U.S. Application Data

(62) Division of application No. 10/176,224, filed on Jun. 20, 2002, now Pat. No. 6,764,662.

(51) Int. Cl.⁷ .............................. B01J 20/34; C01B 3/26
(52) U.S. Cl. ........................................................ 252/373
(58) Field of Search ............................ 252/373; 502/27, 502/28

(56) References Cited

U.S. PATENT DOCUMENTS

| | | | |
|---|---|---|---|
| 3,855,385 A | 12/1974 | Derosset et al. ............... 423/49 |
| 4,094,821 A | 6/1978 | McVicker et al. ........... 252/466 |
| 4,434,240 A | 2/1984 | Pugach ........................ 502/24 |
| 4,482,752 A | 11/1984 | Mitchell et al. ............. 585/670 |
| 4,795,538 A | 1/1989 | Caude et al. ................ 204/111 |
| 4,990,639 A | 2/1991 | Bexten et al. ............... 556/136 |
| 5,085,835 A | 2/1992 | Weber et al. ................. 423/22 |
| 5,102,632 A | 4/1992 | Allen et al. .................. 423/22 |
| 5,201,942 A | 4/1993 | Demopoulos et al. ........ 75/744 |
| 5,302,183 A | 4/1994 | De Boer et al. ............. 75/426 |
| 5,364,445 A | 11/1994 | Sakamoto et al. ............ 75/426 |
| 5,403,566 A | 4/1995 | Panster et al. ................ 423/22 |
| 6,225,507 B1 | 5/2001 | Giessler et al. ............. 568/451 |
| 6,315,812 B1 | 11/2001 | Fleming et al. .............. 75/744 |
| 6,455,018 B1 | 9/2002 | Cuif .......................... 423/21.1 |
| 6,635,191 B2 * | 10/2003 | Figueroa et al. ............ 252/373 |
| 6,726,850 B1 * | 4/2004 | Reyes et al. ................ 252/373 |
| 6,740,615 B2 * | 5/2004 | Zhou .......................... 502/29 |
| 6,753,285 B1 * | 6/2004 | Vaarkamp .................... 502/27 |
| 6,764,662 B2 * | 7/2004 | Chen et al. .................. 423/22 |

* cited by examiner

Primary Examiner—Wayne A. Langel
(74) Attorney, Agent, or Firm—Conley Rose P.C.

(57) ABSTRACT

A method for the recovery of rhodium from spent supported catalysts. In one embodiment, a method for recovering rhodium from a host material includes roasting the host material in air at a temperature sufficient to convert at least a portion of rhodium to $Rh_2O_3$, leaching the host material in a solution with a leaching constituent which is reactive with $Rh_2O_3$ to form a first intermediate species, reacting the first intermediate species in a solution with an acidifying constituent or complexing agent to form a second intermediate species, and purifying the second intermediate species. Preferably, the roasting temperature is approximately from 600° C. to 800° C. for 0.5 to 10 hours. In some embodiments, the host material is ground to particles in the range of 0.1 to 10 mm.

22 Claims, No Drawings

RECOVER AND RECYCLE RHODIUM FROM SPENT PARTIAL OXIDATION CATALYSTS

CROSS-REFERENCE TO RELATED APPLICATIONS

This application is a divisional of U.S. patent application Ser. No. 10/176,224, filed Jun. 20, 2002 U.S. Pat. No. 6,764,662, and entitled "Recover and Recycle Rhodium From Spent Partial Oxidation Catalysts," which is incorporated herein by reference.

STATEMENT REGARDING FEDERALLY SPONSORED RESEARCH OR DEVELOPMENT

Not applicable.

TECHNICAL FIELD OF THE INVENTION

This invention relates to spent catalyst compositions for partial oxidation processes. More particularly this invention relates to a method for recovering and recycling rhodium in spent supported partial oxidation catalysts.

BACKGROUND OF THE INVENTION

The separation and purification of rhodium (Rh) from other precious metals is one of the most difficult and pressing areas in precious metal refining. This situation arises mainly because of the complex solution chemistry in chloride-containing aqueous solutions. The complexes formed by rhodium in these types of solutions are such that modern recovery processes such as solvent extractions (SX), which have been implemented for the recovery of other platinum group metals (PGMs), cannot be easily applied to the recovery of rhodium. Thus far, no industrially acceptable solvent extraction system has been developed for rhodium.

Rhodium is often used in combination with other PGMs in catalysts. In the life of a catalyst, the catalyst may lose some or all of its activity. A catalyst may deactivate through the accumulation of a layer of carbon deposits, or coke. Coke accumulation typically occurs throughout the catalyst pore systems and physically blocks access to active sites. Further, metal agglomeration may occur, which can severely reduce catalyst activity. Still further, poisons (e.g., lead, arsenic, sulfur) may permanently deactivate the catalyst. In many cases, deactivated catalysts are regenerated so that they recover at least part of their initial activity.

Cycles of deactivation and regeneration may occur for many years. The catalyst may be regenerated in situ or removed for ex situ regeneration. In one strategy, a fixed bed or slurry bed reactor unit and a regenerator unit are paired in tandem, for simultaneous operation. After the catalyst is regenerated ex situ it is commonly loaded back to the same or another unit. This procedure has the advantage of reducing down time of the reactor. Alternatively, a catalyst may continuously recirculate between a reactor and a regenerator. Cost savings over fresh catalyst vary widely, but using regenerated catalyst can save 50–80% of the new catalyst cost.

A catalyst that has been through cycles of use and regeneration may, with time, lose the ability to be regenerated to an adequate level of activity, becoming a spent catalyst. This loss of regenerability may be due to incompleteness of the regeneration. For example, in an oxidative regeneration of a coked catalyst, sulfur in the coke is typically not removed to as low a level as coke is removed during regeneration. Further, sulfates associated with alumina supports are typically not removed, nor are metal poisons. Permanent loss of acceptable activity may also occur through sintering or other structural changes.

Often a spent catalyst is discarded. However, a spent catalyst, if discarded, represents a loss of precious material, such as rhodium. Further, use of landfills for such disposal is problematic. For example, available landfills have decreased in number by 75% in the past 20 years, a trend that is expected to continue. Further, environmental liability can reach unacceptable levels if the landfill releases toxins to the environment. Still further, the environmental protection agency (EPA) "Land Ban" imposes restrictions on disposal.

Thus it is desirable to have a method for reclamation of catalyst materials. Reclamation is the process of recovering and recycling a material. For a PGM-containing catalyst, reclamation is particularly desirable for economic reasons. For example, a single drum of spent catalyst may contain thousands of dollars worth of valuable metals, such as rhodium, platinum, palladium, iridium, ruthenium, and osmium.

In particular, it is desirable to have a method for reclamation of rhodium from a spent catalyst. Rhodium is a relatively scarce material and is accordingly rather expensive. The costs of the entire catalytic process could be reduced appreciably by recovery of the rhodium from spent catalysts and subsequent recycling of the metal.

Because multiple PGMs are often used together, it is important to devise techniques to separate them and to purify and recover each of the metals separately. Originally, PGMs were separated after dissolution in oxidizing chlorine leach liquors by the application of a series of precipitation-dissolution steps adopted from analytical chemistry methods. This was the most common route until the middle nineteen seventies. Since then, the major refining companies have considerably modified their processes by implementing the more efficient separation technique of solvent extraction, and to a lesser degree, ion exchange.

In virtually all precious metal recovery systems, rhodium is the last metal recovered through a complicated precipitation technique rather than through the more modern and efficient technique of solvent extraction. The precipitation scheme-dissolution scheme for the recovery of rhodium is not considered satisfactory by most PGM refiners because of its numerous drawbacks. It is a lengthy process, sometimes taking as long as 4 to 6 months for the final recovery of pure rhodium metal and therefore, there is a high value of metal that is locked up in the processing plant. The technique is also quite tedious, as the precipitation must be carried out a number of times in order to ensure that the final product is of acceptable purity and this makes the overall process labor intensive and costly.

In the precipitation-purification method, the first step involves the formation of the nitrite complex $[Rh(NO_2)_6]^{3-}$ from $RhCl_6^{3-}$. Because this complex is extremely stable to hydrolysis, the impure rhodium-containing solution can be subjected to neutralization with NaOH in order that some of the impurities be precipitated through hydrolysis. After a filtration stage, the rhodium in solution is precipitated with ammonium and sodium (from the NaOH) as $Na(NH_4)_2[Rh(NO_2)_6]$, which is a partially selective precipitation step over the other PGMs that may also be present in the rhodium solution. For this precipitation, however, it is important that a high concentration of ammonia be used in order to suppress the solubility of this rhodium complex to achieve almost complete rhodium precipitation. After another filtration stage, the precipitate is redissolved in HCl and, depending on the purity of the solution, the process recommences with the nitrating step.

It is this cycle of precipitation-dissolution stages that renders this process inefficient and labor-intensive. Once the ammonia-nitrite rhodium complex is of acceptable purity, the final dissolution in HCl is followed by the precipitation of rhodium with ammonia to give $(NH_4)_3[RhCl_6]$. It is not only important that the concentration of ammonia be high to suppress the solubility of the rhodium compound, but also that the chloride concentration be high, since it is the hexachloro-complex that is precipitated and therefore the hexachloro-complex must be available in solution. The last step involves the reduction of rhodium to the metallic state either directly from this solution with formic acid or by calcining the complex in the presence of $H_2$ gas at about 1000° C.

As described above, rhodium metal is of high value, and with rapidly increasing demand for catalysts that utilize rhodium, the need to develop more efficient recovery processes such as solvent extraction for rhodium is becoming more urgent. Particularly, a method for recovering rhodium from solid spent catalysts is needed. The difficulty in developing such systems, however, lies in the chemical complexity of rhodium in Cl-containing aqueous solutions.

The main oxidation state of rhodium is +III, although +I and others are known to exist, though to a much lesser extent. The anionic complexes of rhodium are more labile than those of other PGMs, whereas the cationic and neutral complexes are quite inert.

Rhodium (III) readily forms octahedral complexes, as do most d6 configurations, with anions, halides, and oxygen-containing ligands. In terms of solvent extraction, highly charged $RhCl_6^{3-}$ ions are particularly difficult to extract due to steric effects because it is difficult to pack three organic molecules around a single anion.

SUMMARY OF THE INVENTION

It is an object of the present invention to provide a method for the recovery of rhodium from spent supported catalysts, and in particular from spent supported partial oxidation catalysts. The methods of the present invention overcome some of the drawbacks of existing rhodium recovery techniques. The new rhodium recovery methods require fewer steps and are economically feasible for use under commercial-scale conditions.

To separate Rh from a solid phase (i.e., on ceramic support), an acid or other leach solution is used. This initial separation step is done by washing Rh from a column packed with spent catalyst, as if spent catalysts were ion-exchange resins. Only metals originally supported on the catalysts are removed to solution, and the residual solids (largely ceramic support) are discarded after the leaching process. The metal-containing solution is then acidified and purified further via ion-exchange reactions. Acidification with HCl transforms $Rh^{3+}$ into $RhCl_6^{3-}$, an anionic form, so Rh can be separated from other co-existing cationic metals, such as $Sm^{3+}$ on an anionic ion-exchange column. Other methods to make anionic form of Rh is to use nitrite ($NO_2-$), or pseudohalide (CN— or SCN—) acids or salts.

In accordance with a preferred embodiment of the present invention, a method for recovering rhodium from a solid host material includes roasting the host material in air at a temperature sufficient to convert at least a portion of rhodium to $Rh_2O_3$, leaching the host material in a solution with a leaching constituent that is reactive with $Rh_2O_3$ to form a first intermediate species, reacting the first intermediate species in a solution with an acidifying constituent or complexing agent to form a second intermediate species, and purifying the second intermediate species. Preferably, the roasting temperature is approximately from 600° C. to 800° C. for 0.5 to 10 hours. In some embodiments, the host material is ground to particles in the range of 0.1 to 10 mm. The leaching constituents may be chosen from the group including HCl, $HNO_3$, $H_2SO_4$, $HClO_4$, HCN, HSCN, and complex ligands (e.g. ethylenediamine tetraacetic acid (EDTA)). As used herein, a complex is defined as a stable association of a metal with an organic ligand having one or more nitrogen, oxygen or sulfur atoms with a lone pair of electrons (i.e. aliphatic amines). Rh can be removed by ligands from the supports by forming a dissolved Rh complex. The acidifying constituents and complexing agents may be chosen from the group including HCl, $HNO_2$, and mixtures with their respective ammonia or sodium salts. In a preferred embodiment, the second intermediate species is separated by an anionic ion-exchange column.

In accordance with another preferred embodiment of the present invention, a method for recovering rhodium from a spent catalyst includes removing at least a portion of the rhodium from the catalyst via an acid or ligand solution and extracting the rhodium from the acid or ligand solution.

In accordance with yet another preferred embodiment of the present invention, a method for reclaiming rhodium from a spent catalyst includes removing at least a portion of the rhodium from the catalyst via an acid or ligand solution, isolating the rhodium from the acid or ligand solution, and incorporating the isolated rhodium in a fresh catalyst.

These and other embodiments, features and advantages of the present invention will become apparent with reference to the following description.

DETAILED DESCRIPTION OF THE PREFERRED EMBODIMENTS

The selection of a catalyst or catalyst system requires many technical and economic considerations. The process of selecting a catalyst can be broken down into components. Key catalyst properties include high activity, high selectivity, high recycle capability and filterability. Catalyst performance is determined mainly by the active metal components. For example, a metal might be chosen based both on its ability to complete the desired reaction and its inability to complete an unwanted reaction. Additionally, a catalyst may also include a support and may take any desired shape, including monolithic, spherical, etc.

Rhodium is often used in partial oxidation catalyst systems because it gives extremely high activity in the dehydrogenation of hydrocarbons. Specifically, rhodium is capable of dehydrogenation at moderate temperatures and pressures.

The present invention includes a method for recovery rhodium from spent catalyst using the following steps:

roasting the host material in air at a temperature sufficient to convert at least a portion of rhodium to $Rh_2O_3$;

leaching the host material in a solution with a leaching constituent that is reactive with $Rh_2O_3$ to form a first intermediate species;

reacting the first intermediate species in a solution with an acidifying constituent or complexing agent to form a second intermediate species; and purifying the second intermediate species.

In one embodiment, the host material is a spent partial oxidation catalyst. The host material may be porous, such as a foam or monolith, or may be nonporous, such as a solid sphere. When the host material is porous, it is preferable to grind the host material to particles in the range of 0.1 to 10 mm to expose more rhodium. It is not necessary to grind nonporous structures.

During the roasting, the rhodium component is oxidized to $Rh_2O_3$. In this case, the process takes place in the presence of excess air at temperatures of approximately 600° C. to 800° C. for 0.5 to 10 hours.

In a preferred embodiment of the present invention, following roasting and grinding if necessary, the host material is packed into a leaching column as slurry with deionized (DI) water. Once the column is sufficiently packed, a leaching constituent is used to leach out the rhodium from the host material at a predetermined rate. The leaching constituent is preferably chosen from the group including HCl, $HNO_3$, $H_2SO_4$, $HClO_4$, HCN, HSCN, and complex ligands (e.g. ethylenediamine tetraacetic acid (EDTA)). In a preferred embodiment, the leaching constituent is dilute HCl, ranging from 0.5M to 5M HCl. Preferably, the leach rate is approximately 0.1–1% bed volume per minute to achieve sufficient separation and reduced total volume. This solution containing the first intermediate species (i.e. $RhCl_3$) may then be concentrated, preferably by evaporation on a hot plate at a temperature below the boiling point of the solution.

Once first intermediate species is concentrated, it is reacted with an acidifying constituent or complexing agent. The acidifying constituent/complexing agent is preferably chosen from the group including HCl, $HNO_2$, HCN, HSCN, and mixtures thereof with their respective ammonia or sodium salts. In a preferred embodiment, the acidifying constituent is concentrated HCl, of at least 6M HCl. Acidifying or complexing the first intermediate species preferably forms an anionic, second intermediate species (i.e. $[RhCl_6]^{3-}$).

The anionic, second intermediate species is then purified or separated from other cationic metal ions (e.g. $Cu^{2+}$, $Yb^{3+}$, $Mn^{2+}$, $Ni^{2+}$, $Zn^{2+}$, $Sm^{3+}$). Preferably, the second intermediate species is separated by an anionic ion exchange column with $NH_4Cl$, $NH_4NO_2$, or $NaNO_2$ as eluting agents for other cationic metal ions. The form of eluting agents (i.e., either chloride or nitrite salt) should be the same as the reacting agents in the previous step. After removing the cationic metal ions, the adsorbed Rh complexes can be recovered by eluting with a base, preferably $NH_4OH$. In a preferred embodiment, the eluting rate is approximately 0.1–1% bed volume per minute.

Ion exchange is a reversible chemical reaction wherein an ion, an atom or molecule that has lost or gained an electron and thus acquired an electrical charge, is exchanged from solution for a similarly charged ion attached to an immobile solid particle. The solid ion exchange particles are preferably naturally occurring inorganic zeolites or synthetically produced organic resins. The synthetic organic resins are the predominant ion exchange material used today because their characteristics can be tailored to specific applications.

An organic ion exchange resin is composed of high molecular weight polyelectrolytes that can exchange their mobile ions for ions of similar charge from the surrounding medium. Each resin has a distinct number of mobile ions that set the maximum quantity of exchanges per unit of resin.

Ion exchange resins are classified as cation exchangers, which have positively charged mobile ions available for exchange, and anion exchangers, whose exchangeable ions are negatively charged. Both cation and anion resins are produced from the same basic organic polymers. They differ in the ionizable group attached to the hydrocarbon network. It is this functional group that determines the chemical behavior of the resin. Resins can be broadly classified as strong or weak acid cation exchangers or strong or weak base anion exchangers.

Ion exchange processing can be accomplished by either a batch method or a column method. In the first, the resin and solution are mixed in a batch tank, the exchange is allowed to come to equilibrium, then the resin is separated from solution. The degree to which the exchange takes place is limited by the preference the resin exhibits for the ion in solution. Consequently, the use of resins exchange capacity will be limited unless the selectivity for the ion solution is far greater than for the exchangeable ion attached to the resin. Because batch regeneration of the resin is chemically inefficient, batch processing ion exchange has limited potential for application.

Alternatively, passing a solution through a column containing a bed of exchange resin is analogous to treating the solution in an infinite series of batch tanks. As a result, separations are possible even when there is poor selectivity for the ion being removed.

An example of the reactants and products for rhodium separation and purification according to one preferred embodiment are shown below:

| | | | |
|---|---|---|---|
| 1) Roasting | $2Rh + 3O_2$ | → | $2Rh_2O_3$ |
| 2) Leaching | $Rh_2O_3 +$ 6HCl (dilute) | → | $2RhCl_3 + 3H_2O$ |
| 3) Acidification/ Complexation | $RhCl_3 + 3HCl$ (concentrated) | → | $[RhCl_6]^{3-} + 3H^+$ |
| 4) Purification* | $3R^+\text{-}[RhCl_6]^{3-} +$ $3NH_4OH$ | → | $RhCl_3 + 3NH_4Cl + 3R^+\text{-}OH^-$ |
| 5) Concentration | $RhCl_3 + nH_2O$ | → | $RhCl_3 \cdot nH_2O$ |

*$R^+$ represents the functional group of an ion-exchange resin

Step 1 is preferably carried out in air at 600–800° C. Step 5 is preferably carried out at 60–100° C. to isolate Rh as $RhCl_3 \cdot nH_2O$. In some embodiments (i.e. a purification requiring a faster drying time), step 4 may be carried out in a vacuum.

In a preferred embodiment, the product (i.e. $RhCl_3 \cdot nH_2O$) is kept as a $RhCl_3$ stock solution with predetermined Rh concentrations. This stock solution is preferably used for partial oxidation catalyst preparation.

Catalyst

A host material, or rhodium-bearing catalyst, according to the preferred embodiments of the present invention may include any suitable support material. Preferably, the support is a catalyst support. The catalyst support may be any of a variety of materials on which a catalytically active material may be coated. The catalyst support preferably allows for a high degree of metal dispersion. The choice of support is largely determined by the nature of the reaction system. The support catalyst is preferably stable under reaction and regeneration conditions. Further, it preferably does not adversely react with solvent, reactants, or reaction products. Suitable supports include activated carbon, alumina, silica, silica-alumina, carbon black, $TiO_2$, $ZrO_2$, $CaCO_3$, and $BaSO_4$. Preferably, the catalytically active material is supported on carbon, alumina, zirconia, titania or silica.

It will be understood that alternative choices of support may be made without departing from the preferred embodiments of the present invention by one of ordinary skill in the art. A support preferably favorably influences any of the catalyst activity, selectivity, recycling, refining, material handling reproducibility and the like. Properties of a support include surface area, pore volume, pore size distribution, particle size distribution, attrition resistance, acidity, basicity, impurity levels, and the ability to promote metal-support interactions. Metal dispersion increases with support surface area. Support porosity influences metal dispersion and distribution, metal sintering resistance, and intraparticle diffusion of reactants, products and poisons. Smaller support particle size increases catalytic activity but decreases filterability. The support preferably has desirable mechanical properties, attrition resistance and hardness. For example, an attrition resistant support allows for multiple catalyst recycling and rapid filtration. Further, support impurities preferably are inert. Alternatively, the support may contain additives that enhance catalyst selectivity.

As described above, the recovered rhodium is preferably recycled for use in an active, or fresh, catalyst. The catalysts of the present invention may be prepared by any of the methods known to those skilled in the art. By way of illustration and not limitation, such methods include impregnating the catalytically active compounds or precursors onto a support, extruding one or more catalytically active compounds or precursors together with support material to prepare catalyst extrudates, and/or precipitating the catalytically active compounds or precursors onto a support. Accordingly, the supported catalysts of the present invention may be used in the form of powders, particles, pellets, monoliths, honeycombs, packed beds, foams, aerogels, granules, beads, pills, cylinders, trilobes, extrudates, spheres or other rounded shapes, or another manufactured configurations.

The most preferred method of preparation may vary among those skilled in the art, depending for example on the desired catalyst particle size. Those skilled in the art are able to select the most suitable method for a given set of requirements.

One method of preparing a supported metal catalyst is by incipient wetness impregnation of the support with an Rh stock solution. Another method of preparing a supported metal catalyst is by a melt impregnation technique, which involves preparing the supported metal catalyst from a molten metal salt. For higher metal loading, the methods may be repeated until desired loading is achieved.

In some embodiments, additional promoters and/or base metals may be used. The prepared catalysts are preferably used in partial oxidation operating conditions.

Without further elaboration, it is believed that one skilled in the art can, using the description herein, utilize the present invention to its fullest extent. The following embodiments are to be construed as illustrative, and not as constraining the scope of the present invention in any way whatsoever.

What is claimed is:

1. A method for the manufacture of synthesis gas comprising:
   a) producing a feed gas mixture comprising a hydrocarbon and oxygen containing gas;
   b) reacting the feed gas mixture over a solid catalyst that contains more than approximately 0.01% rhodium by weight so as to produce a product gas comprising hydrogen and carbon monoxide and a spent or used catalyst that contain rhodium; and
   c) removing at least a portion of the rhodium from the spent catalyst via an acid solution, and isolating the rhodium from the acid solution to recover or reclaim said rhodium from the spent catalyst.

2. The method of claim 1 wherein the recovered rhodium is used in the manufacture of fresh rhodium catalyst.

3. The method of claim 1 wherein the recovered rhodium is use to reduced the net operating cost by selling the recovered rhodium.

4. The method of claim 1 wherein step c) is accomplished by a method comprising:
   c1) roasting the spent catalyst in air at a roasting temperature sufficient to convert at least a portion of rhodium to $Rh_2O_3$;
   c2) leaching the spent catalyst in a solution with a leaching constituent that is reactive with $Rh_2O_3$ to form a first intermediate species;
   c3) reacting the first intermediate species in a solution with an acidifying constituent or complexing agent to form a second intermediate species;
   c4) purifying the second intermediate species from the other species; and
   c5) converting the second intermediate species to a final product and recovering said final product.

5. The method according to claim 4 wherein the roasting temperature is from about 600° C. to 800° C.

6. The method according to claim 5 wherein step c1) occurs for approximately 0.5 to 10 hours.

7. The method according to claim 4 wherein the spent catalyst is essentially nonporous.

8. The method according to claim 1 wherein the spent catalyst is porous.

9. The method according to claim 8 wherein the spent catalyst comprises particles in the range of 0.10 to 10 mm.

10. The method according to claim 4 wherein the leaching constituent is selected from the group consisting of HCl, $HNO_3$, $H_2SO_4$, $HClO_4$, HCN, HSCN and complex ligands.

11. The method according to claim 10 wherein the leaching constituent is HCl.

12. The method according to claim 11 wherein the leaching constituent comprises from 0.5M to 5M HCl.

13. The method according to claim 12 wherein the leaching constituent is cycled to the host material at a leach rate of approximately 0.1 to 1% bed volume per minute.

14. The method according to claim 11 wherein the first intermediate species consists essentially of $RhCl_3$.

15. The method according to claim 4 wherein the acidifying constituent or complexing agent is selected from the group consisting of HCl, $HNO_2$, and mixtures thereof with their respective ammonia or sodium salts.

16. The method according to claim 15 wherein the acidifying constituent is HCl.

17. The method according to claim 16 wherein the acidifying constituent is at least 6M HCl.

18. The method according to claim 4 wherein step c3) is carried out in an ion exchange system.

19. The method according to claim 4 wherein step c4) comprises separating the second intermediate species in an anionic ion exchange column to form a product.

20. The method according to claim 19 wherein the product is kept as a rhodium-containing stock solution having a predetermined rhodium concentration.

21. The method according to claim 19 wherein the product comprises $RhCl_3 \cdot nH_2O$.

22. The method according to claim 4 wherein step c5) includes eluting the final product with a base.

* * * * *